Patented Sept. 6, 1949

2,481,470

UNITED STATES PATENT OFFICE 2,481,470

PROCESS FOR THE PREPARATION OF AROMATIC COFFEE EXTRACT

Heinrich Cohen, Geneva, Switzerland, assignor to Laboratoires Medial S. A., Geneva, Switzerland, a corporation of Switzerland No Drawing. Application June 26, 1948, Serial No. 35,535. In Switzerland June 28, 1947

10 Claims. (Cl. 99—71)

There exist many processes for preparing coffee extracts. These processes have recourse to an extraction with the help of organic solvents, an aqueous extraction, or to these two methods combined. Extraction with certain organic solvents, such as alcohol, benzene, etc., withdraws from the coffee not only the constituents imparting flavor but also the fatty substances contained in the coffee. But, the presence of said fatty substances is wholly undesirable in the finished extracts, for these substances are liable to turn rancid which makes such extra perishable or at least of a very poor quality.

Moreover, it has been noted that certain volatile elements obtained by extraction with the help of organic solvents, such as ethyl alcohol, have an offensive smell or are of no value for the extract wanted.

The present invention relates to a process for the preparation of an aromatic coffee extract free from fatty substances and free from elements more volatile than ethyl alcohol, which process consequently does not possess the drawbacks noted above.

According to this process, as in certain processes already known, roasted coffee is first subjected to an extraction by means of ethyl alcohol, then to an aqueous extraction (hot water, steam), the products resulting from both these extractions being thereafter combined.

The process according to the invention is characterised, however, in that an alcoholic extract is prepared which is concentrated in constituents imparting flavor, said extract being subjected to at least one cooling action to precipitate therefrom practically all the fatty substances which are separated thereafter from the solution, and that the solution thus void of fatty substances is utilised to finally combine with the practically dry residue resulting from the aqueous extraction only the flavor-imparting constituents which are less volatile than ethyl alcohol.

The alcoholic extraction may be effected at ordinary temperature, or hot, but at less than 60° C., or even cold, in fact approaching 0° C.; in the latter case the percentage of fatty substances extracted is low.

To obtain a concentrated alcoholic extract, the alcoholic solution may be enriched with constituents imparting flavor by bringing it into contact with roasted coffee less and less drained of those constituents.

If the quantity of alcohol used for the extraction is relatively large, it is necessary to proceed with a concentration of the alcoholic extract before cooling it. The operations of concentration, cooling and separation of the fatty substances may be repeated.

The temperature at which the solution is cooled down, for the precipitation of the fatty substances, may properly be of —10° C. or less, according to the concentration of the solution and to its fat content.

The separation of the fatty substances from the cooled down solution may be done by decanting, filtering, etc. After this separation, a solution is obtained from which no fatty substance precipitates when it is concentrated even to dryness. This solution retains the essential constituents of the coffee, which impart flavor to the infusion thereof. Such a result is unhoped for, for it could have been expected that the concentration of the extraction solution and the cooling of the concentrated solution would have eliminated from the extraction solution, not only the fats, but also the major part of the valuable constituents. The experience shows that by the concentration and the cooling, the fats precipitate as well as phyosterins and bitter subsances, but no valuable aromatic constituent is thus eliminated from the extraction solution.

This solution free from fatty substances may be added just as it is to the practically dry residue resulting from the aqueous extraction, then the alcohol is evaporated, preferably by evaporation in vacuo, which eliminates therewithal all the constituents more volatile and as volatile as alcohol. The adding of the solution may also be done gradually and simultaneously with the evaporation of the alcohol.

The solution free from fatty substances may also be concentrated by evaporation of the alcohol and of the volatile constituents therein contained, then the concentrate thus obtained is combined with the practically dry residue resulting from the aqueous extraction.

In whichever of those two cases, the final product only retains the constituents less volatile than ethyl alcohol.

As may be understood, the process of the invention while retaining the advantages of processes employing extractions with organic solvents, does not possess the drawbacks inherent in such extractions, i. e., the presence of fatty substances and of volatile constituents in the extracts. Moreover, this process is simple and does not subject the constituents imparting flavor to any treatment liable to deteriorate them, in opposition to what has been proposed in the American Patent No. 1,137,265, according to which the removal of the fatty substances is effected by saponification of the latter and elimination of the soaps formed.

By way of example, this is how the process of the invention may be carried out in practice:

Roasted and ground coffee is subjected to an extraction with ethyl alcohol at ordinary temperature. If the operation is done with a battery of extractors, connected in series, an alcoholic solution is generally obtained which is highly concentrated in products of extraction. This solution is subjected to cooling at a temperature of at least —10° C. until the fats which are dissolved therein precipitate entirely. According to the concentration of the alcohol employed and the temperature of cooling, the fats precipitate either in the solid state or in the oily state. When the precipitation is terminated, the fats are separated, for example by decanting, filtering, centrifugalising, a redissolution of the fats being avoided by maintaining the low temperature. When the concentrate of fat in the alcoholic extraction solution is high, two layers of liquid may form: fat and alcohol. In this case, before cooling, the lower layer consisting of fat may be removed beforehand. If, on the contrary, the alcoholic solution is not sufficiently concentrated, it should be concentrated, preferably in vacuo, then cooled, and the precipitated fats of the cooled solution eliminated as described above. The operations of concentration and cooling may even be repeated, if necessary, so as to ensure a thorough elimination of the fats.

Whichever method is adopted, an alcoholic solution of the essential and aromatic products is obtained which is completely free from fatty substances. This solution void of fats is then combined with the dry residue obtained from the extraction with hot water of the disaromatised coffee. The alcohol is evaporated either in vacuo or under ordinary pressure, the mixture being continuously stirred meanwhile. The constituents as volatile as the alcohol are eliminated therewith.

According to a modified method, the alcoholic extraction, instead of being effected at ordinary temperature, or even hot (60° C.), may be executed cold, approaching 0° C. In this case, only a small proportion of the fatty substances is withdrawn by the organic extraction solvent, which simplifies their subsequent elimination by concentration and cooling of the solution, the aromatic constituents, however, being extracted in sufficient quantities. The rest of the process is carried out as described above in the example.

What I claim is:

1. Process for the preparation of aromatic coffee extract, which comprises subjecting roasted coffee to the action of ethyl alcohol, subjecting the remaining residue to an aqueous extraction, concentrating the aqueous extract substantially to a solid, subjecting the alcoholic extract to at least a single cooling action to precipitate fatty substances contained in the alcoholic solution, separating the fatty substances from the solution, and combining the alcoholic solution thus freed from the fatty substances with the dried aqueous extract.

2. In the process as defined in claim 1, the step of concentrating said alcoholic extract, before its being subjected to said cooling action, by evaporating part of the alcohol contents.

3. In the process as defined in claim 1, the step of concentrating said alcoholic solution freed from the fatty substances, before the solution is combined with said dried aqueous extract, by evaporating part of the alcohol contents and such elements as are at least as volatile as ethyl alcohol.

4. The process as defined in claim 1, said alcoholic extract, before its being subjected to said cooling action, being brought into contact with roasted coffee less and less freed from flavor-imparting constituents.

5. The process as defined in claim 1, wherein the roasted coffee is subjected to the action of ethyl alcohol at a temperature below about 60° C.

6. The process as defined in claim 1, wherein the roasted coffee is subjected to the action of ethyl alcohol at temperatures down to about 0° C.

7. The process as defined in claim 1, said cooling action being carried out at temperatures below about —10° C.

8. Process for the preparation of aromatic coffee extract, which comprises subjecting roasted coffee to the action of ethyl alcohol, subjecting the remaining residue to an aqueous extraction, concentrating the aqueous extract substantially to a solid, subjecting the alcoholic extract to at least a single cooling action to precipitate fatty substances contained in the alcoholic solution, separating the fatty substances from the solution, combining the solution thus freed from the fatty substances with the dried aqueous extract, and evaporating from the mixture the alcohol and such elements as are at least as volatile as ethyl alcohol.

9. In the process as defined in claim 8, the step of concentrating said alcoholic solution freed from the fatty substances, before the solution is combined with said dried aqueous extract, by evaporating part of the alcohol contents and such elements as are at least as volatile as ethyl alcohol.

10. The process as defined in claim 8, wherein the evaporation is carried out under vacuum.

HEINRICH COHEN.

REFERENCES CITED

The following references are of record in the file of this patent:

UNITED STATES PATENTS

| Number | Name | Date |
|---|---|---|
| 686,689 | Eschwege | Nov. 12, 1901 |
| 1,137,265 | Hubner | Apr. 27, 1913 |
| 1,175,490 | Vietinghoft | Mar. 14, 1916 |